(12) United States Patent
Kato

(10) Patent No.: US 10,400,720 B2
(45) Date of Patent: Sep. 3, 2019

(54) PARTITION PLATE

(71) Applicant: SUBARU CORPORATION, Tokyo (JP)

(72) Inventor: Masaaki Kato, Toyko (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/885,429

(22) Filed: Jan. 31, 2018

(65) Prior Publication Data

US 2018/0283330 A1    Oct. 4, 2018

(30) Foreign Application Priority Data

Mar. 28, 2017  (JP) .................................. 2017-062161

(51) Int. Cl.
*F02M 35/12* (2006.01)
*F02M 35/10* (2006.01)

(52) U.S. Cl.
CPC ... *F02M 35/1211* (2013.01); *F02M 35/10118* (2013.01); *F02M 35/10262* (2013.01)

(58) Field of Classification Search
CPC ......... F02M 35/1211; F02M 35/10118; F02M 35/10262; F02M 35/10255; F02M 35/10124; F02M 35/10367; F02M 35/116; F02M 35/1045; F02F 1/4242
See application file for complete search history.

(56) References Cited

U.S. PATENT DOCUMENTS

| | | | | |
|---|---|---|---|---|
| 5,924,398 A | * | 7/1999 | Choi ....................... | F02D 9/104 123/184.21 |
| 7,198,026 B2 | * | 4/2007 | Masuta .................... | B22C 9/10 123/302 |
| 9,488,111 B2 | * | 11/2016 | Gibson, II ............ | F02D 9/1095 |
| 2002/0020389 A1 | | 2/2002 | Wolters | |
| 2002/0078921 A1 | | 6/2002 | Kim et al. | |
| 2004/0211390 A1 | * | 10/2004 | Kim ........................ | F02B 31/06 123/308 |
| 2004/0226536 A1 | | 11/2004 | Sakai et al. | |
| 2014/0245983 A1 | | 9/2014 | Free et al. | |

FOREIGN PATENT DOCUMENTS

| | | |
|---|---|---|
| CN | 1536201 A | 10/2004 |
| JP | H07-025230 A1 | 5/1995 |
| JP | 2002-201948 | 7/2002 |
| JP | 2011-241742 A1 | 12/2011 |
| JP | 2014-101774 A | 6/2014 |

OTHER PUBLICATIONS

Office Action dated Aug. 28, 2018 during the prosecution of Japanese Patent Application No. 2017-062161.

(Continued)

*Primary Examiner* — Syed O Hasan
(74) *Attorney, Agent, or Firm* — Troutman Sanders LLP

(57) ABSTRACT

A partition plate includes a main body and a plurality of protrusions. The main body is configured to be disposed in an intake passage of an engine partition the intake passage. The protrusions are provided at an end of the main body. The end is located toward a combustion chamber. Each protrusion is inclined relative to a width direction of the main body from an apex toward a base. The apex protrudes so as to be the closest toward the combustion chamber, and the base is the farthest from the combustion chamber.

16 Claims, 4 Drawing Sheets

(56) References Cited

OTHER PUBLICATIONS

Decision to Grant a Patent dated Nov. 6, 2018 for Japanese Application No. 2017-062161.
First Office Action issued in corresponding Chinese Patent Application No. 201810002138.3 dated Apr. 23, 2018.

* cited by examiner

PARTITION PLATE

CROSS-REFERENCE TO RELATED APPLICATIONS

The present application claims priority from Japanese Patent Application No. 2017-062161 filed on Mar. 28, 2017, the entire contents of which are hereby incorporated by reference.

BACKGROUND

1. Technical Field

The present invention relates to partition plates that partition intake passages.

2. Related Art

In the related art, an engine provided with a partition plate that partitions an intake port into two passages (i.e., a first passage and a second passage) for generating tumble flow within the combustion chamber has been developed (for instance, see Japanese Unexamined Patent Application Publication No. 2014-101774). By using a tumble generation valve (TGV) to reduce the opening of the first passage partitioned by the partition plate within the fuel consumption range, the flow rate of intake air flowing into the combustion chamber from the second passage is increased, so that strong tumble flow can be generated within the combustion chamber.

In the above-described partition plate, the intake air separates from the partition plate at the end thereof located toward the combustion chamber, thus causing a separation vortex to occur. If the effect of the separation vortex is large, the intake air flowing into the combustion chamber fluctuates, thus causing the stability of the combustion to decrease and noise to occur.

SUMMARY OF THE INVENTION

It is desirable to provide a partition plate that can reduce fluctuations in the flow rate caused by a separation vortex of intake air.

An aspect of the present invention provides a partition plate including a main body and a plurality of protrusions. The main body is configured to be disposed in an intake passage of an engine and partition the intake passage. The plurality of protrusions are provided at an end of the main body. The end is located toward a combustion chamber. Each protrusion is inclined relative to a width direction of the main body from an apex toward a base. The apex protrudes so as to be the closest toward the combustion chamber, and the base is the farthest from the combustion chamber.

DETAILED DESCRIPTION

Figure 1:
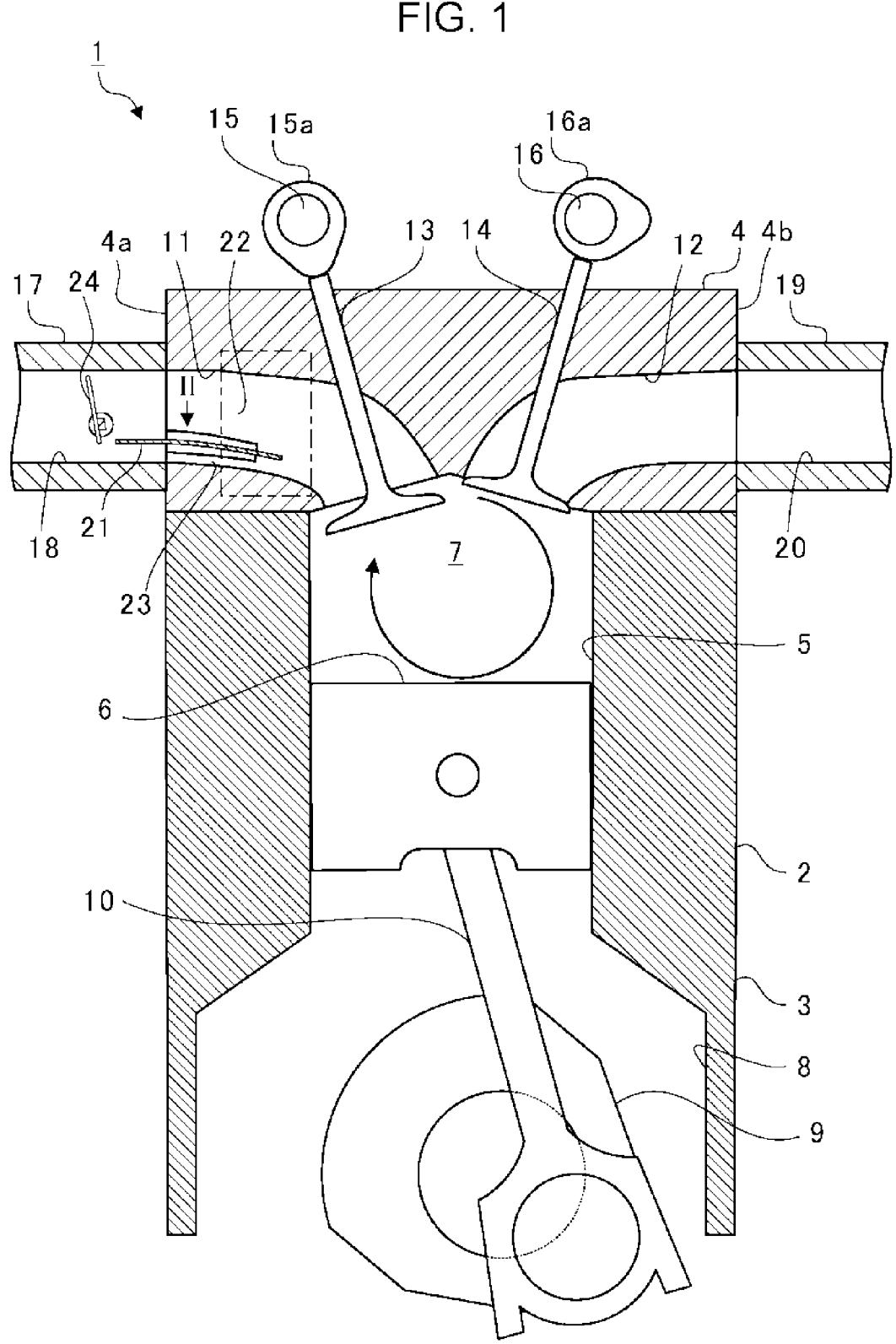
FIG. 1 illustrates the configuration of an engine.

A preferred example of the present invention will be described in detail below with reference to the appended drawings. For instance, the dimensions, materials, and other specific numerical values indicated in this example are merely examples for providing an easier understanding of the example of the invention and are not intended to limit the example of the present invention, unless otherwise specified. In this description and the drawings, components having substantially identical functions and configurations are given the same reference signs, and redundant descriptions thereof are omitted. Furthermore, components that are not directly related to the example of the present invention are not illustrated in the drawings.

FIG. 1 illustrates the configuration of an engine 1. As illustrated in FIG. 1, the engine 1 is provided with a cylinder block 2, a crankcase 3 integrated with the cylinder block 2, and a cylinder head 4 fixed to the cylinder block 2.

The cylinder block 2 has a cylinder bore 5. In the cylinder bore 5, a piston 6 is slidably supported by a connecting rod 10. In the engine 1, a space surrounded by the cylinder head 4, the cylinder bore 5, and the crown of the piston 6 serves as a combustion chamber 7.

A crankshaft 9 is rotatably supported within a crank chamber 8 formed by the crankcase 3. The connecting rod 10 is rotatably supported by the crankshaft 9. Thus, the piston 6 is coupled to the crankshaft 9 by the connecting rod 10.

The cylinder head 4 has an intake port 11 and an exhaust port 12 that spatially communicate with the combustion chamber 7. The intake port 11 has one opening at the intake upstream side and two openings at the intake downstream side facing the combustion chamber 7, and branches off into two passages in midstream from the upstream side toward the downstream side.

The exhaust port 12 has two openings at the exhaust upstream side facing the combustion chamber 7 and one opening at the exhaust downstream side, and merges into one passage in midstream from the upstream side toward the downstream side.

The head of an intake valve 13 is located between the intake port 11 and the combustion chamber 7, and the head of an exhaust valve 14 is located between the exhaust port 12 and the combustion chamber 7. An intake camshaft 15 to which a cam 15a is fixed and an exhaust camshaft 16 to which a cam 16a is fixed are provided within a cam chamber surrounded by the cylinder head 4 and a head cover (not illustrated). The intake camshaft 15 and the exhaust camshaft 16 are coupled to the crankshaft 9 by a timing chain and rotate in accordance with rotation of the crankshaft 9.

The cam 15a abuts on a shaft end of the intake valve 13 and is rotated by the intake camshaft 15 so as to move the intake valve 13 in the axial direction. This causes the intake valve 13 to open and close between the intake port 11 and the combustion chamber 7. The cam 16a abuts on a shaft end of the exhaust valve 14 and is rotated by the exhaust camshaft 16 so as to move the exhaust valve 14 in the axial direction. This causes the exhaust valve 14 to open and close between the exhaust port 12 and the combustion chamber 7.

The cylinder head 4 is provided with an ignition plug (not illustrated) the tip of which is located within the combustion chamber 7. By igniting the ignition plug at a predetermined timing, a mixture of air and fuel flowing into the combustion chamber 7 via the intake port 11 is combusted. The combustion causes the piston 6 to reciprocate within the cylinder bore 5, and the reciprocation is converted into rotation of the crankshaft 9 via the connecting rod 10.

In the engine 1, an upstream end 4a where the intake port 11 is provided in the outer wall surface of the cylinder head 4 is coupled to an intake manifold 17. An intake passage 18 to which intake air is introduced is provided inside the intake manifold 17 and the intake port 11.

Furthermore, in the engine 1, a downstream end 4b where the exhaust port 12 is provided in the outer wall surface of the cylinder head 4 is coupled to an exhaust manifold 19. An exhaust passage 20 to which exhaust air is introduced is provided inside the exhaust manifold 19 and the exhaust port 12.

A partition plate 21 is disposed inside the intake passage 18. The partition plate 21 extends in the extending direction of the intake passage 18 (i.e., the flowing direction of the intake air). The partition plate 21 is gradually curved in conformity to the shape of the intake passage 18 from the upstream side toward the downstream side in the intake-air flowing direction. The partition plate 21 is optimized in accordance with the shape of the intake passage 18 and may have a straight shape as an alternative to the above-described shape.

The partition plate 21 partially partitions the intake passage 18 in the vertical direction in FIG. 1 so as to form a first passage 22 and a second passage 23 (passage). Specifically, the intake passage 18 is partially partitioned into the first passage 22 and the second passage 23 by the partition plate 21. The second passage 23 gradually decreases in cross section toward the downstream side in the flowing direction.

A tumble generation valve (TGV) 24 is disposed in the intake passage 18 at the upstream side of the partition plate 21 and adjusts the opening of the first passage 22. As illustrated in FIG. 1, when the opening of the TGV 24 is at a minimum and the first passage 22 is mostly closed by the TGV 24, the intake air introduced to the intake passage 18 is introduced to the combustion chamber 7 via the second passage 23.

When the engine 1 is to run in a fuel saving mode, the opening of the first passage 22 is reduced, so that most of the intake air is made to pass through the second passage 23. Accordingly, in the engine 1, the intake air with the increased flow rate is made to flow into the combustion chamber 7, so that strong tumble flow indicated by an arrow is generated within the combustion chamber 7 and a stable high-dilution lean-burn operation is realized, thereby allowing for improved fuel consumption as well as improved combustion stability.

Figure 2:
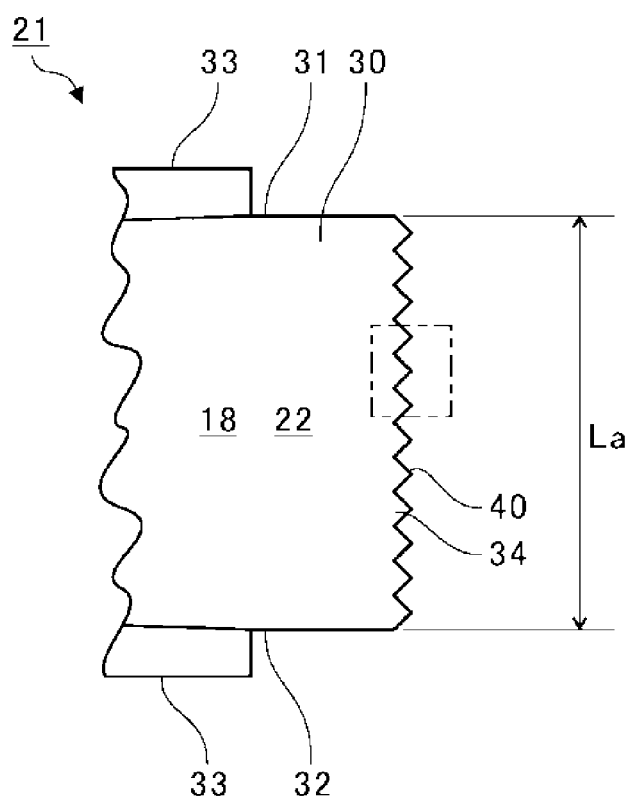
FIG. 2 illustrates a partition plate, as viewed from an arrow II in FIG. 1.

FIG. 2 illustrates the partition plate 21, as viewed from an arrow II in FIG. 1. In FIG. 2, the upstream side of the partition plate 21 in the intake-air flowing direction (i.e., the left side in FIG. 2, which is the side far from the combustion chamber 7) has been omitted. The partition plate 21 is composed of either one of resin, such as plastic, and metal, such as aluminum.

As illustrated in FIG. 2, the partition plate 21 has a substantially-plate-shaped main body 30. The main body 30 has a breadth La (i.e., the width in the vertical direction in FIG. 2) that is larger than the thickness thereof in the depth direction in the plane of the drawing in FIG. 2 (i.e., the direction in which the first passage 22 and the second passage 23 are disposed).

The length of the main body 30 (i.e., the length in the horizontal direction in FIG. 2) in the extending direction of the intake passage 18 is larger than the aforementioned thickness (in the depth direction in the plane of the drawing). The direction of the breadth La of the main body 30 will be referred to as "width direction" hereinafter. The width direction is orthogonal to the extending direction of the intake passage 18 and is also orthogonal to the direction in which the first passage 22 and the second passage 23 are disposed. The breadth La of the main body 30 is substantially equal to the length, in the width direction, of the intake passage 18 in which the partition plate 21 is disposed.

In the main body 30, widthwise sides 31 and 32 are provided with guides 33 extending in the extending direction of the intake passage 18. The inner wall of the intake passage 18 is provided with grooves engageable with the guides 33, and the partition plate 21 is fixed inside the intake passage 18 by using the guides 33.

In the main body 30, an end 34 located toward the combustion chamber 7 (i.e., at the downstream side in the intake-air flowing direction) is provided with protrusions 40. The protrusions 40 are disposed in a plurality in the width direction. The protrusions 40 will be described in detail later.

Figure 3:
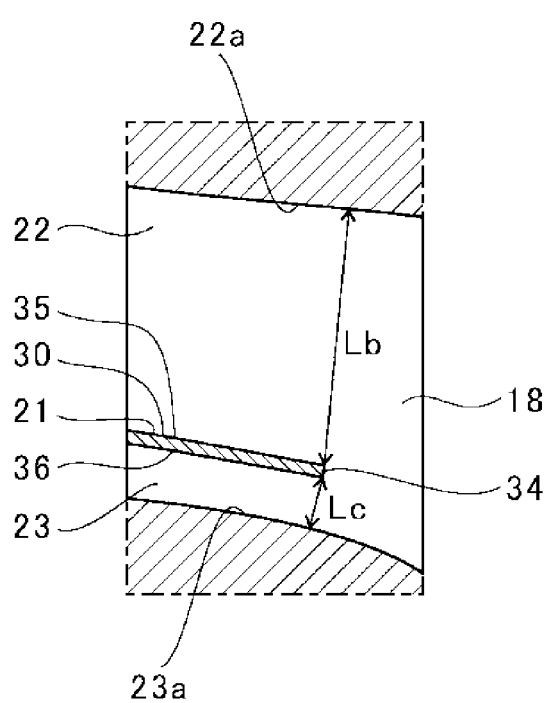
FIG. 3 is an extracted view of an area indicated by a single-dot chain line in FIG. 1.

FIG. 3 is an extracted view of an area indicated by a single-dot chain line in FIG. 1. In FIG. 3, the guides 33 are not illustrated. As illustrated in FIG. 3, the main body 30 of the partition plate 21 has a first surface 35 facing the first passage 22 and a second surface 36 facing the second passage 23. The first surface 35 and the second surface 36 extend in the extending direction as well as the width direction of the intake passage 18. The first surface 35 faces an inner wall surface 22a of the first passage 22, and the second surface 36 faces an inner wall surface 23a of the second passage 23.

As described above, the second passage 23 has a cross section that is the same or gradually decreases downstream in the flowing direction. Specifically, the second surface 36 of the main body 30 is sufficiently close to the inner wall surface 23a of the second passage 23 at the end 34.

At the end 34 of the main body 30, the distance from the first surface 35 to the inner wall surface 22a of the first passage 22 will be defined as "first distance Lb". At the end 34 of the main body 30, the distance from the second surface 36 to the inner wall surface 23a of the second passage 23 (i.e., the distance from the main body 30 to the inner wall surface 23a) will be defined as "second distance Lc" (separation distance). The second distance Lc is smaller than the first distance Lb.

Figure 4:
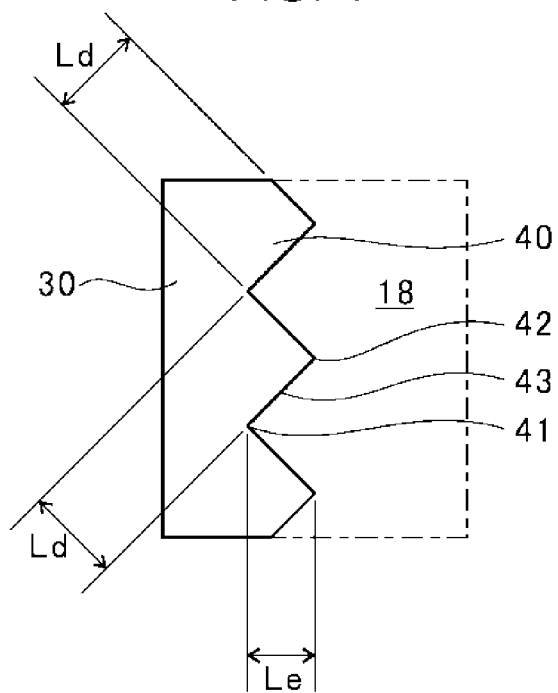
FIG. 4 is an extracted view of an area indicated by a single-dot chain line in FIG. 2.

FIG. 4 is an extracted view of an area indicated by a single-dot chain line in FIG. 2. As illustrated in FIG. 4, the protrusions 40 have bases 41, apices 42, and slopes 43. In the protrusions 40, the bases 41 are the farthest from the combustion chamber 7. Specifically, in the protrusions 40, the bases 41 are located at the most upstream side in the intake-air flowing direction. In the protrusions 40, the apices 42 protrude from the bases 41 so as to be the closest to the combustion chamber 7. Specifically, in the protrusions 40, the apices 42 are located at the most downstream side in the intake-air flowing direction.

In the protrusions 40, the slopes 43 extend from the apices 42 toward the bases 41. Each slope 43 is inclined relative to the width direction of the main body 30. Moreover, each slope 43 is inclined relative to the extending direction of the intake passage 18 (i.e., the intake-air flowing direction or the horizontal direction in FIG. 4). The slopes 43 extend in a direction that is neither parallel to nor orthogonal to the extending direction of the intake passage 18.

At the end 34 of the main body 30, the apices 42 and the bases 41 are alternately disposed in the width direction. Each protrusion 40 is substantially-mountain-shaped, such that two slopes 43 extend respectively from two neighboring bases 41 toward a single apex. 42. Neighboring protrusions 40 share the same base 41. At the end 34, the plurality of protrusions 40 are continuously provided in the width direction so as to form a saw blade shape in its entirety.

The linear distance (distance Ld) between each apex 42 and each base 41 is smaller than or equal to the second distance Lc. Specifically, the length of each slope 43 is smaller than or equal to the second distance Lc.

Furthermore, the protruding width Le from each base 41 toward the combustion chamber 7 is smaller than or equal to the second distance Lc. Specifically, the length of each slope 43 in the extending direction of the intake passage 18 is smaller than or equal to the second distance Lc.

Figure 5:
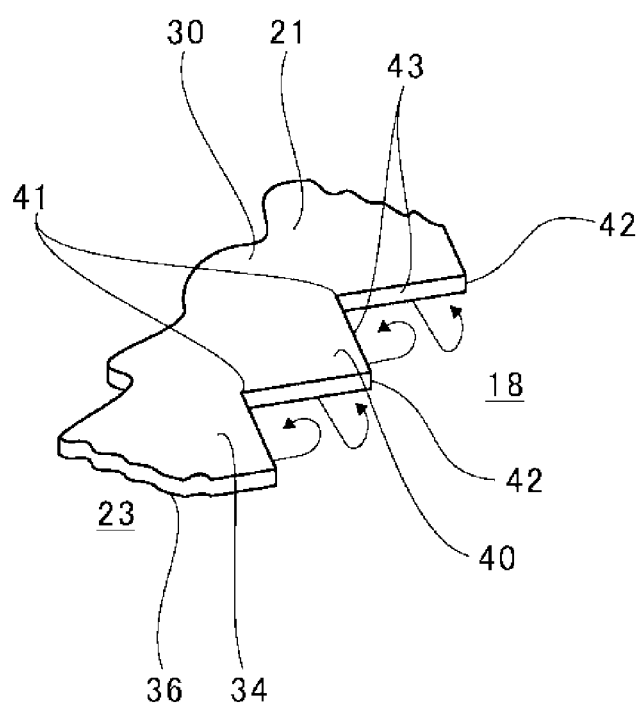
FIG. 5 illustrates separation vortexes.

FIG. 5 illustrates separation vortexes. In a case where the intake passage 18 is provided with the partition plate 21, the intake air separates from the main body 30, thus causing separation vortexes to occur at the end 34. If the separation vortexes that periodically occur are too large, the intake air flowing into the combustion chamber 7 fluctuates (i.e., turbulence occurs in the mainstream of the intake air), thus causing the stability of the combustion to decrease and noise to occur.

If the region where the intake air separates in the separation surface (i.e., the second surface 36) has a large linear length, the effect of the separation vortexes becomes larger. In a case where there are no protrusions 40, a separation vortex with magnitude according to the length of the end 34 in the width direction occurs. As illustrated in FIG. 5, in a case where the end 34 of the main body 30 is provided with a plurality of protrusions 40, the intake-air flowing direction near the slopes 43 is substantially orthogonal to the slopes 43. Because the intake air separates from each of the slopes 43, the region where the intake air separates in the separation surface (i.e., the second surface 36) has a small linear length. Therefore, the effect of the separation vortexes becomes smaller, as compared with a case where there are no protrusions 40. In addition, separation vortexes occurring at neighboring protrusions 40 interfere with each other, causing the separation vortexes to weaken.

Accordingly, the separation vortexes are reduced and weakened by the plurality of protrusions 40, so that fluctuations in the intake air flowing into the combustion chamber 7 are reduced, thereby achieving improved combustion stability, improved fuel consumption, and reduced noise.

The aforementioned second distance Lc is the representative length of the second passage 23 at the end 34. Because the linear distance (distance Ld) between the apex 42 and the base 41 of each protrusion 40 is smaller than or equal to the second distance Lc, that is, smaller than or equal to the representative length, the length of the slope 43 is sufficiently reduced. Therefore, the separation vortexes can be sufficiently reduced.

If the inclination angle of each slope 43 relative to the width direction is too close to the right angle, the intake-air flowing direction near the slope 43 is less likely to change. Thus, the effect of the protrusions 40 is reduced, causing the separation vortexes to become too large, similar to a case where there are no protrusions 40. Because the protruding width Le of each protrusion 40 from the base 41 toward the combustion chamber 7 is smaller than or equal to the second distance Lc, the intake-air flowing direction changes near the slope 43, so that the separation vortex is readily reduced.

Figure 6:
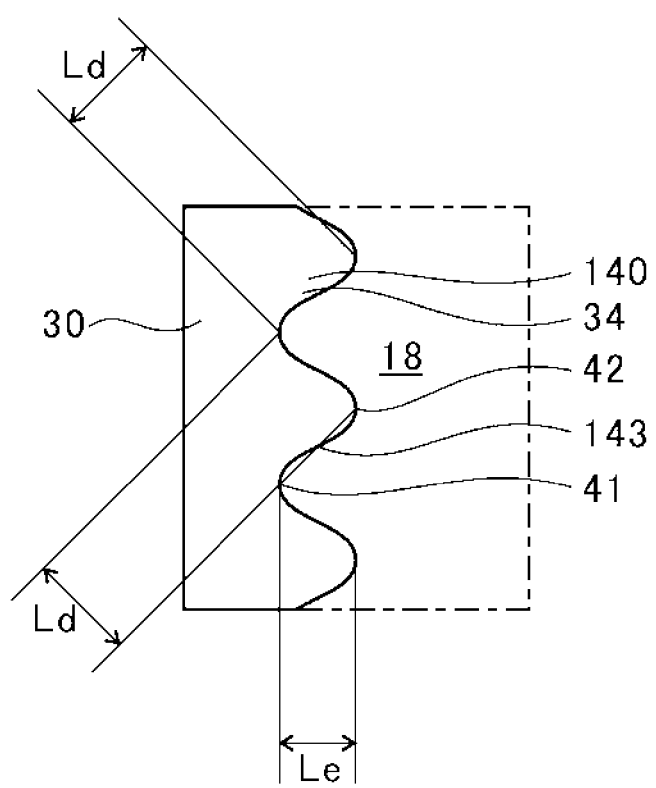
FIG. 6 illustrates a modification.

FIG. 6 illustrates a modification. As illustrated in FIG. 6, in this modification, protrusions 140 are substantially corrugated, such that slopes 143 formed between apices 42 and the bases 41 are curved.

Similar to the above-described example, each slope 143 is inclined relative to the width direction of the main body 30 and is also inclined relative to the extending direction of the intake passage 18. The linear distance (distance Ld) between each apex 42 and each base 41 is smaller than or equal to the second distance Lc, and the protruding width Le from each base 41 toward the combustion chamber 7 is smaller than or equal to the second distance Lc.

This modification is similar to the above-described example in that the magnitude of separation vortexes occurring at the end 34 becomes smaller, as compared with a case where there are no protrusions 140, and separation vortexes occurring at neighboring protrusions 140 interfere with each other, causing the separation vortexes to weaken, thereby achieving improved combustion stability in the combustion chamber 7, improved fuel consumption, and reduced noise.

Although a preferred example of the present invention has been described above with reference to the appended drawings, the present invention is not limited to the example. It is apparent to a skilled person that various modifications and alterations are conceivable within the technical scope described in the claims, and it is to be understood that such modifications and alterations belong to the technical scope of the present invention.

For instance, in the example and the modification described above, the linear distance (distance Ld) between each apex 42 and each base 41 is smaller than or equal to the second distance Lc. Alternatively, the linear distance (distance Ld) between each apex 42 and each base 41 may be larger than the second distance Lc.

Furthermore, in the example and the modification described above, the protruding width Le from each base 41 toward the combustion chamber 7 is smaller than or equal to the second distance Lc. Alternatively, the protruding width Le from each base 41 toward the combustion chamber 7 may be larger than the second distance Lc.

According to the example of the present invention, fluctuations in the flow rate caused by a separation vortex of intake air can be reduced.

The invention claimed is:

1. A partition plate comprising: a main body configured to be disposed in an intake passage of an engine and partition the intake passage; and a plurality of protrusions disposed within a cylinder head, provided at a downstream end of the main body, the end being located toward a combustion chamber, each protrusion being inclined relative to a width direction of the main body from an apex toward a base, the apex protruding so as to be closest toward the combustion chamber, the base being farthest from the combustion chamber, wherein in each protrusion, a linear distance between the apex and the base is smaller than or equal to a separation distance from an inner wall surface to the main body, the inner wall surface facing the main body in one of partitioned passages of the intake passage, the one of the partitioned passages being a passage with a smaller cross section, wherein in each protrusion, a protruding width from the base toward the combustion chamber is smaller than or equal to the separation distance from the inner wall surface to the main body.

2. The partition plate of claim 1, wherein the partition plate is composed of either one of resin and metal.

3. The partition plate of claim 1, wherein the main body has a width that is larger than a thickness of the main body.

4. The partition plate of claim 3, wherein the width of the main body is substantially equal to a length of the intake passage.

5. The partition plate of claim 1, wherein the main body has a length that is larger than a thickness of the main body.

6. The partition plate of claim 1, wherein the width direction of the main body is orthogonal to an extending direction of the intake passage.

7. The partition plate of claim 1, wherein the width direction of the main body is orthogonal to a direction in which the partitioned passages are disposed.

8. The partition plate of claim 1, further comprising guides provided on widthwise sides of the main body extending in an extending direction of the intake passage.

9. The partition plate of claim 8, wherein the inner wall surface is provided with grooves engageable with the guides, and the partition plate is fixed inside the intake passage by using the guides.

10. The partition plate of claim 1, wherein the base is located at a most upstream side in an intake-air flowing direction.

11. The partition plate of claim 1, wherein the apex is located at a most downstream side in an intake-air flowing direction.

12. The partition plate of claim 1, wherein each protrusion is inclined relative to an extending direction of the intake passage.

13. The partition plate of claim 1, wherein apices and bases are alternatively disposed at the downstream end of the main body in the width direction.

14. The partition plate of claim 1, wherein each protrusion has two slopes that extend respectively from two neighboring bases toward the apex.

15. The partition plate of claim 1, wherein the plurality of protrusions are continuously provided at the downstream end of the main body in the width direction to form a saw blade shape.

16. The partition plate of claim 1, wherein the plurality of protrusions are substantially corrugated such that a slope formed between the apex and the base is curved.

* * * * *